United States Patent
Beale et al.

(10) Patent No.: US 11,228,400 B2
(45) Date of Patent: Jan. 18, 2022

(54) COMMUNICATIONS DEVICE, INFRASTRUCTURE EQUIPMENT AND METHODS

(71) Applicant: Sony Corporation, Tokyo (JP)

(72) Inventors: Martin Warwick Beale, Basingstoke (GB); Shin Horng Wong, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 769 days.

(21) Appl. No.: 16/078,016

(22) PCT Filed: Feb. 6, 2017

(86) PCT No.: PCT/EP2017/052561
§ 371 (c)(1),
(2) Date: Aug. 21, 2018

(87) PCT Pub. No.: WO2017/144262
PCT Pub. Date: Aug. 31, 2017

(65) Prior Publication Data
US 2021/0194638 A1    Jun. 24, 2021

(30) Foreign Application Priority Data
Feb. 25, 2016 (EP) .................................... 16157489

(51) Int. Cl.
*H04L 1/18* (2006.01)
*H04W 4/70* (2018.01)
(Continued)

(52) U.S. Cl.
CPC .......... *H04L 1/1819* (2013.01); *H04L 1/0054* (2013.01); *H04L 5/006* (2013.01);
(Continued)

(58) Field of Classification Search
CPC ... H04L 1/1819; H04L 1/0054; H04L 5/0007; H04L 5/0037; H04L 5/0042; H04L 5/006;
(Continued)

(56) References Cited

U.S. PATENT DOCUMENTS 9,998,269 B2 * 6/2018 Park ...................... H04L 5/0053
2015/0195069 A1 * 7/2015 Yi .......................... H04W 76/27
370/329

FOREIGN PATENT DOCUMENTS

WO    2017/029009 A1    2/2017

OTHER PUBLICATIONS

3GPP Draft: R1-157783, "Way Forward on NB-IoT," 3GPP TSG RAN WG1 #83, Anaheim, USA, Nov. 15-22, 2015, pp. 1-3.
(Continued)

*Primary Examiner* — Vineeta S Panwalkar
(74) *Attorney, Agent, or Firm* — Xsensus LLP

(57) ABSTRACT

A communications device including a receiver configured to receive signals from an infrastructure equipment of a wireless communications network in accordance with a wireless access interface provided by the infrastructure equipment, and a controller configured to control the receiver to receive data from the infrastructure equipment via a downlink of the wireless access interface. The controller is configured in combination with the receiver to receive a message from the infrastructure equipment which has been transmitted with a number of repetitions in a search space formed in the wireless access interface. The search space extends in time sufficient to span a transmission of the message at a highest repetition level associated with the highest number of repetitions and transmitted on radio resources selected by the infrastructure equipment from a plurality of candidates for radio resources which define the search space.

20 Claims, 11 Drawing Sheets

(51) Int. Cl.
    *H04L 1/00*      (2006.01)
    *H04L 5/00*      (2006.01)
(52) U.S. Cl.
    CPC .......... *H04L 5/0007* (2013.01); *H04L 5/0037*
            (2013.01); *H04L 5/0042* (2013.01); *H04W*
                                    *4/70* (2018.02)
(58) Field of Classification Search
    CPC ....... H04L 1/0046; H04L 5/0053; H04L 1/08;
                                    H04W 4/70
    See application file for complete search history.

(56)            References Cited

OTHER PUBLICATIONS

Holma, H. and Toskala, A., "LTE for UMTS: OFDMA and SC-FDMA Based Radio Access," First published: Mar. 31, 2009, Copyright © 2009 John Wiley & Sons, Ltd,Print ISBN:9780470994016, pp. 1-8.
Huawei et al., "NB-PDCCH search space," 3GPP Draft; R1-160320, 3GPP TSG-RAN WG1 Meeting #84, St. Julian's, Malta, Feb. 15-19, 2016, Feb. 15, 2016-Feb. 19, 2016 14, pp. 1-5.
Mediatek Inc., "Resource mapping and search space design for NB-PDCCH," 3GPP Draft; R1-160828, 3GPP TSG-RAN WG1 Meeting #84, St. Julian's, Malta, Feb. 15-19, 2016, Feb. 15, 2016-Feb. 19, 2016, pp. 1-3.
Nokia Networks, "Search Space Design for MTC," 3GPP Draft; R1-156639, 3GPP TSG-RAN WG1 Meeting #83, Anaheim, USA, Nov. 15-22, 2015, Nov. 15, 2015-Nov. 22, 2015, Nov. 15, 2015 (Nov. 15, 2015), pp. 1-4.
Qualcomm Incorporated, "New Work Item: NarrowBand IoT NB-IoT," 3GPP Draft: RP-151621, 3GPP TSG RAN Meeting #69, Phoenix, USA, Sep. 14-16, 2015, pp. 1-9.
Sony, "Considerations on MPDCCH Repetitions," 3GPP Draft; R1-156697, 3GPP TSG-RAN WG1 Meeting #83, Anaheim, USA, Nov. 15-22, 2015, Nov. 15, 2015-Nov. 22, 2015, pp. 1-5.
Spreadtrum Communications, "Search space design for MPDCCH," 3GPP Draft; R1-155605, 3GPP TSG-RAN WG1 Meeting #82bis, Malmö, Sweden, Oct. 5-9, 2015, Oct. 5, 2015-Oct. 9, 2015, pp. 1-5.
International Search Report and Written Opinion for International Application No. PCT/EP2017/052561 dated Apr. 19, 2017.

* cited by examiner

COMMUNICATIONS DEVICE, INFRASTRUCTURE EQUIPMENT AND METHODS

BACKGROUND

The present application claims the priority under the Paris convention of European patent application 16157489.2, the contents of which are herein incorporated by reference.

Field of Disclosure

The present disclosure relates to communications devices which are configured to receive a message which has been transmitted within a search space of a wireless access interface comprising a plurality of repeated transmissions of the message accordingly providing different candidates for reception. The present disclosure also relates to infrastructure equipment for transmitting messages to communications devices via a search space of a wireless access interface and methods for the same.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Third and fourth generation wireless communications systems, such as those based on the third generation project partnership (3GPP) defined UMTS and Long Term Evolution (LTE) architecture are able to support sophisticated services such as instant messaging, video calls as well as high speed internet access. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will need to support communications to and from a much wider range of devices, including reduced complexity devices, machine type communication devices, devices which require little or no mobility, high resolution video displays and virtual reality headsets. As such, supporting such a wide range of communications devices can represent a technical challenge for a wireless communications network.

A current technical area of interest to those working in the field of wireless and mobile communications is known as "The Internet of Things" or IoT for short. The 3GPP has proposed to develop technologies for supporting narrow band (NB)-IoT using an LTE or 4G wireless access interface and wireless infrastructure. Such IoT devices are expected to be low complexity and inexpensive devices requiring infrequent communication of relatively low bandwidth data. It is also expected that there will be an extremely large number of IoT devices which would need to be supported in a cell of the wireless communications network. Furthermore such NB-IoT devices are likely to be deployed indoors and/or in remote locations making radio communications challenging.

SUMMARY OF THE DISCLOSURE

According to one example embodiment of the present technique a communications device comprises a receiver configured to receive signals from an infrastructure equipment of a wireless communications network in accordance with a wireless access interface provided by the infrastructure equipment, and a controller configured to control the receiver to receive data from the infrastructure equipment via a downlink of the wireless access interface. The wireless access interface includes communications resources for allocation to the communications device on the downlink, the communications resources comprising time resources in which the wireless access interface is divided into predetermined time-divided units. The controller is configured in combination with the receiver to receive a message from the infrastructure equipment which has been transmitted with a number of repetitions in a search space fainted in the wireless access interface over a number of time units. The search space extends in time sufficient to span a transmission of the message at a highest repetition level associated with the highest number of repetitions and transmitted on radio resources selected by the infrastructure equipment from a plurality of candidates for radio resources which define the search space for the communications device to search for the message. The plurality of candidates comprises candidates associated with a number, N, of different repetition levels for the transmission of the message, and the different repetition levels corresponding with different numbers of repetitions for the transmission of the message. The controller is configured to control the receiver to receive the message within the search space in accordance with a search space pattern for which the receiver can receive a predetermined number of candidates of the message within a time allocated for receiving the message, which is less than or equal to a number of candidates of the message which can be received from the search space within the time allocated for receiving the message.

Embodiments of the present technique can provide an arrangement in which an infrastructure equipment transmits a message to a communications device via a search space which is formed in the wireless access interface and defined by a number of repeated transmissions of the message according to different transmission levels over a number of time units. The search space extends in time sufficient to span a transmission of the message at a highest repetition level associated with the highest number of repetitions and transmitted on radio resources selected by the infrastructure equipment from a plurality of candidates for radio resources which define the search space for the communications device to search for the message. The different repetition levels correspond with different numbers of repetitions for the transmission of the message. The infrastructure equipment is configured to puncture the search space in accordance with a search space pattern for a communications device to receive the message from the search space in accordance with the search space pattern by selecting some of the repetition candidates to transmit and not others. Accordingly a communications device can receive a predetermined number of candidates of the message within a time allocated for receiving the message, which is less than a number of candidates of the message which can be received from the search space (maximum number of candidates)

within the time allocated for receiving the message. As such a communications device can be arranged to receive the message with a reduced amount of processing power compared with transmitting the message in all of the candidates (a repetition and a staring point), by ensuring that the message can be received within the predetermined number of candidate messages.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Conventional Communications System

Figure 1:
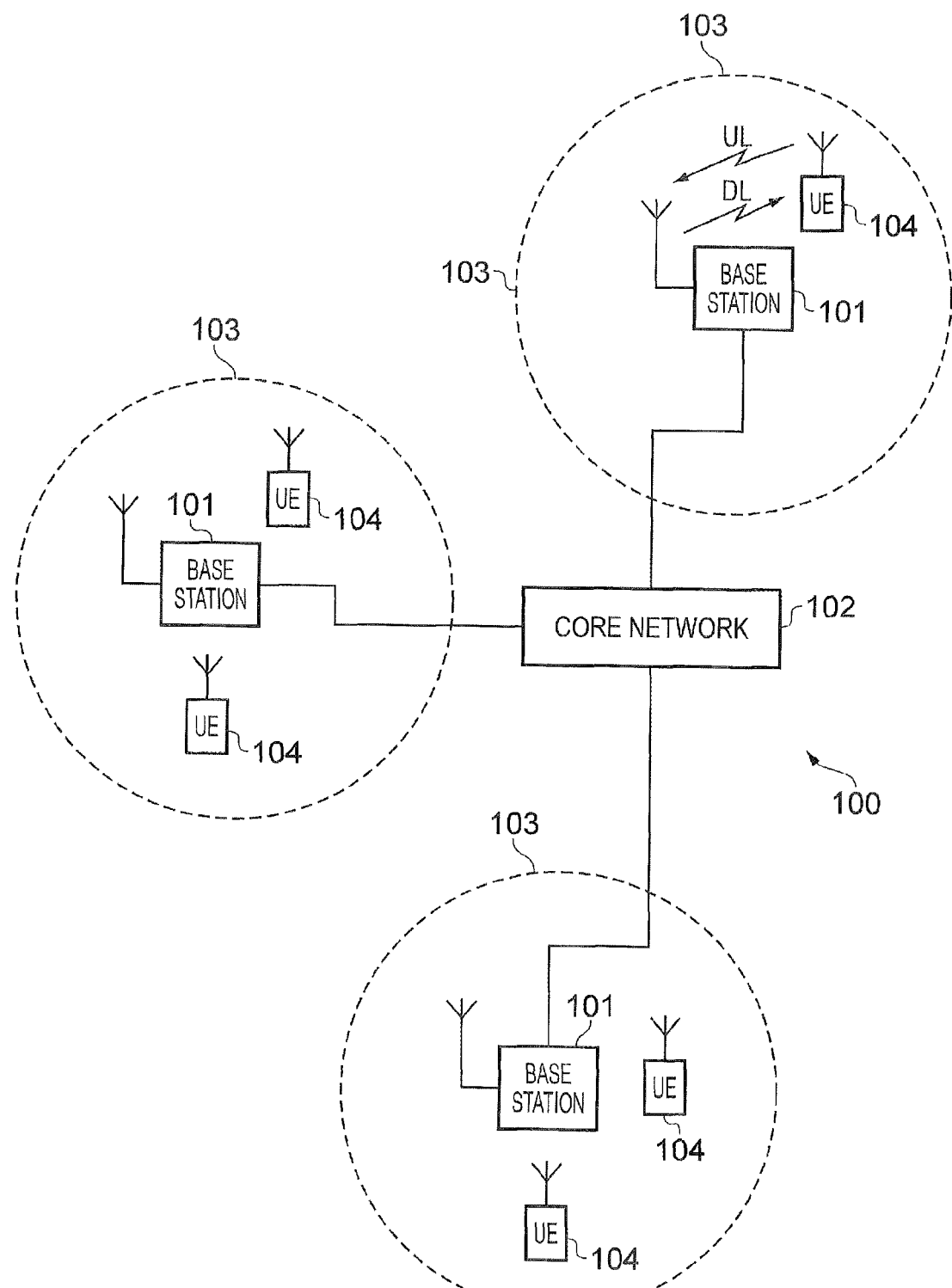
FIG. 1 is a schematic block diagram illustrating an example of a mobile telecommunication system.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications are made using radio resources that are licensed for exclusive use by the operator of the network 100. The core network 102 routes data to and from the communications devices 104 via the respective base stations 101 and provides functions such as authentication, mobility management, charging and so on. Communications devices may also be referred to as mobile stations, user equipment (UE), user device, mobile radio, and so forth. Base stations may also be referred to as transceiver stations/infrastructure equipment/NodeBs/eNodeBs (eNB for short), and so forth.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Figure 2:
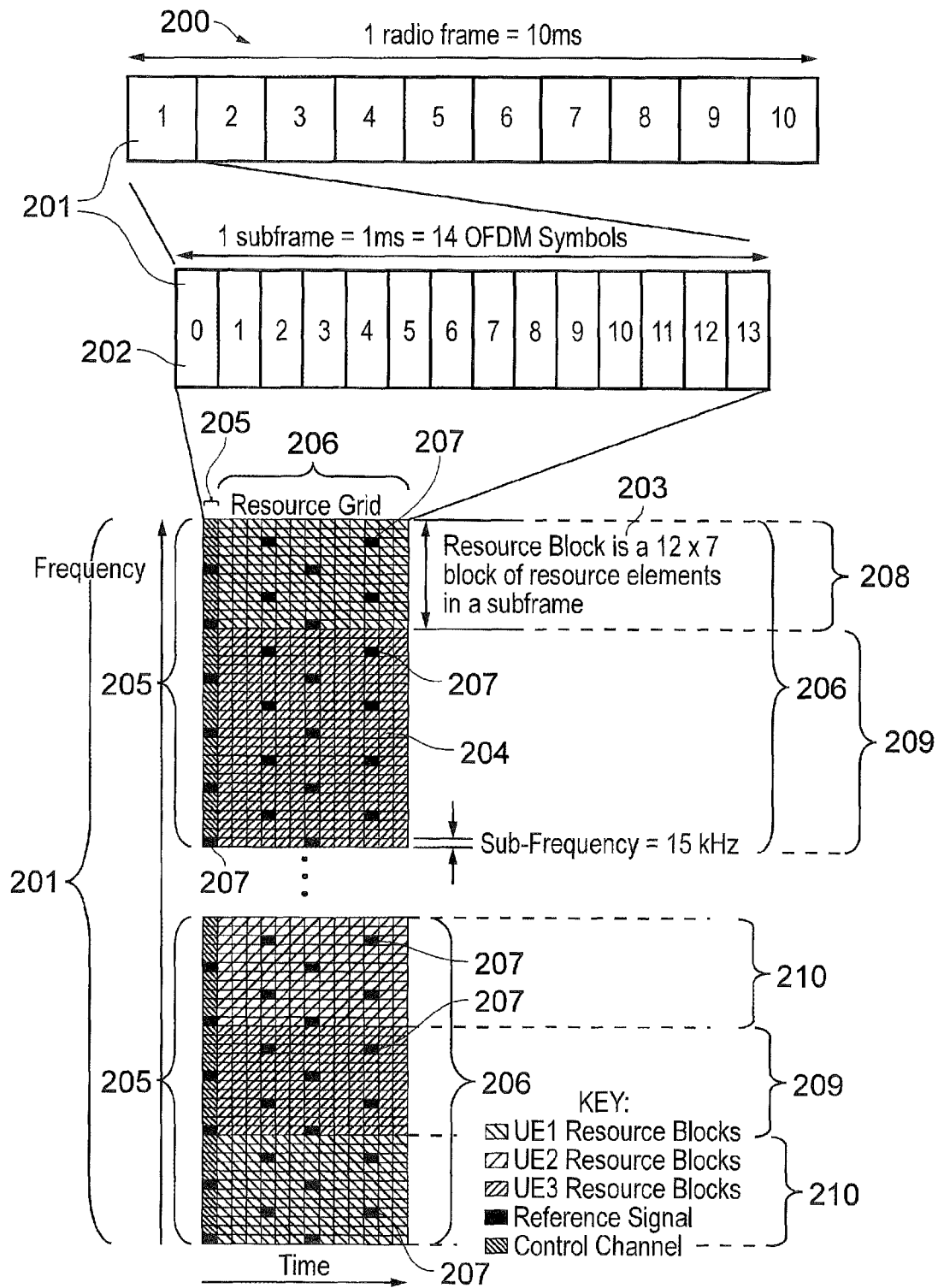
FIG. 2 is a schematic representation illustrating a frame structure of a downlink of a wireless access interface according to an LTE standard.

FIG. 2 provides a simplified schematic diagram of the structure of a downlink of a wireless access interface that may be provided by or in association with the eNB of FIG. 1 when the communications system is operating in accordance with the LTE standard. In LTE systems the wireless access interface of the downlink from an eNB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHz and 20 MHz bandwidth may be divided into 128 to 2048 orthogonal subcarriers for example. Each subcarrier bandwidth may take any value but in LIE it is conventionally fixed at 15 kHz. However it has been proposed in the future [2][3] to provide also a reduced subcarrier spacing of 3.75 kHz for certain parts of the LTE wireless access interface for both the uplink and the downlink. As shown in FIG. 2, the resources of the wireless access interface are also temporally divided into frames where a frame 200 lasts 10 ms and is subdivided into 10 subframes 201 each with a duration of 1 ms. Each subframe is formed from 14 OFDM symbols and is divided into two slots each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. More details of the downlink structure of the LTE wireless access interface are provided in Annex 1.

Figure 3:
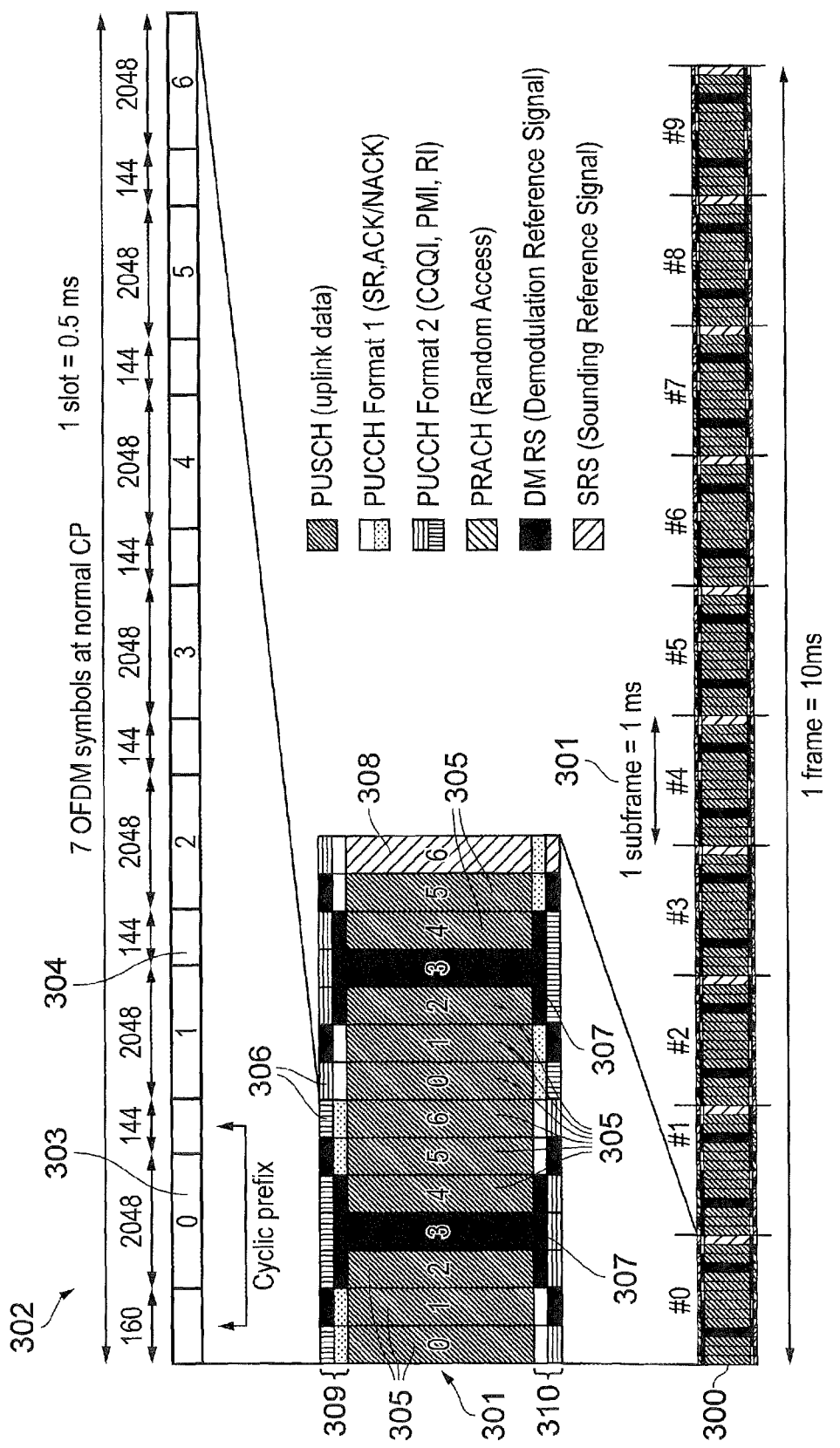
FIG. 3 is a schematic representation illustrating a frame structure of an uplink of wireless access interface according to an LTE standard.

FIG. 3 provides a simplified schematic diagram of the structure of an uplink of an LTE wireless access interface that may be provided by or in association with the eNB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. In FIG. 3 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a similar manner to downlink subframes. More details of the LTE uplink represented in FIG. 3 are provided in Annex 1.

Narrowband Internet of Things

As explained above, it has been proposed to develop an adaptation of a mobile communications network to accommodate narrow band communications within an existing wireless access interface which has been developed to provide broadband wireless communications. For example, in 3GPP a project relating to improvements to LTE wireless access interfaces to provide for a Narrowband Internet of Things (NB-IoT) was agreed [2]. This project is aimed at improved indoor coverage, support for massive number of low throughput devices, low delay sensitivity, ultra-low device cost, low device power consumption and (optimised) network architecture. An example of such a device is a smart meter. It has been proposed that an NB-IoT communications system supports a bandwidth of only 180 kHz and can have three operational modes:

1. 'Stand-alone operation' utilizing for example the spectrum currently being used by GERAN systems as a replacement of one or more GSM carriers 2. 'Guard band operation' utilizing the unused resource blocks within a LTE carrier's guard-band 3. 'In-band operation' utilizing resource blocks within a normal LTE carrier One of the objectives of NB-IoT is to provide extended coverage of up to 20 dB. The main mechanism to extend coverage is to perform numerous repetitions of a message to be received at a receiving device, such that the receiver can accumulate the signal energy over the repetitive samples in order for it to have an increased signal-to-noise ratio (SNR), which increases the likelihood of successful decoding of the message at the receiving device.

Figure 4:
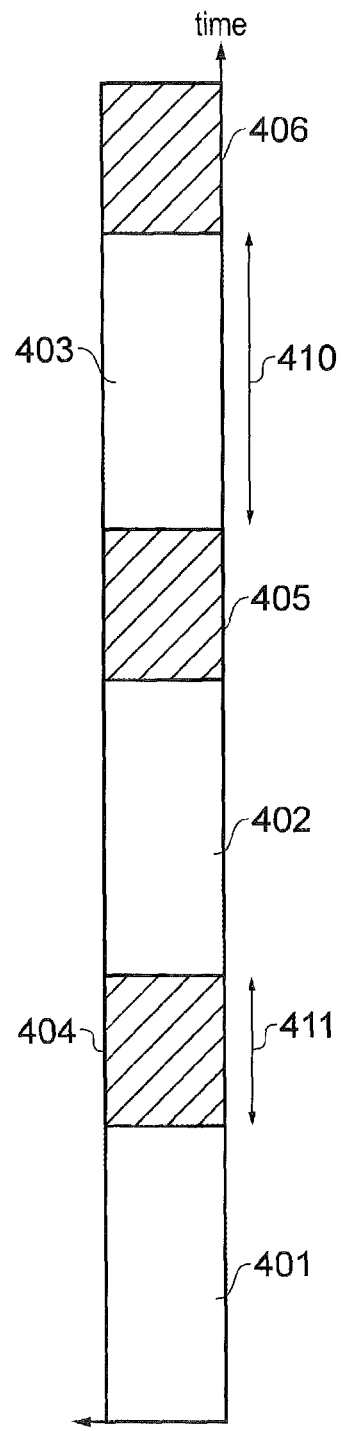
FIG. 4 is a schematic representation of the structure of multiple search spaces transmitted by a wireless network to a user equipment.

A search space consists of combinations of Control Channel Elements (CCEs), which constitute the narrowband physical downlink control channel (NB-PDCCH), over one or more Physical Resource Blocks (PRBs) and over one or more subframes. In NB-IoT systems, it is the working assumption that search spaces have gaps of at least four subframes (4 ms) between each search space. FIG. 4 is a schematic representation of the structure of multiple search spaces transmitted by a wireless network to a user equipment. A first search space 401, a second search space 402, and a third search space 403 are each a number of subframes 410 in length, which is eight in this example, with gaps 404, 405, 406 of four subframes 411 in length following each of the search spaces 401, 402, 403.

Figure 5:
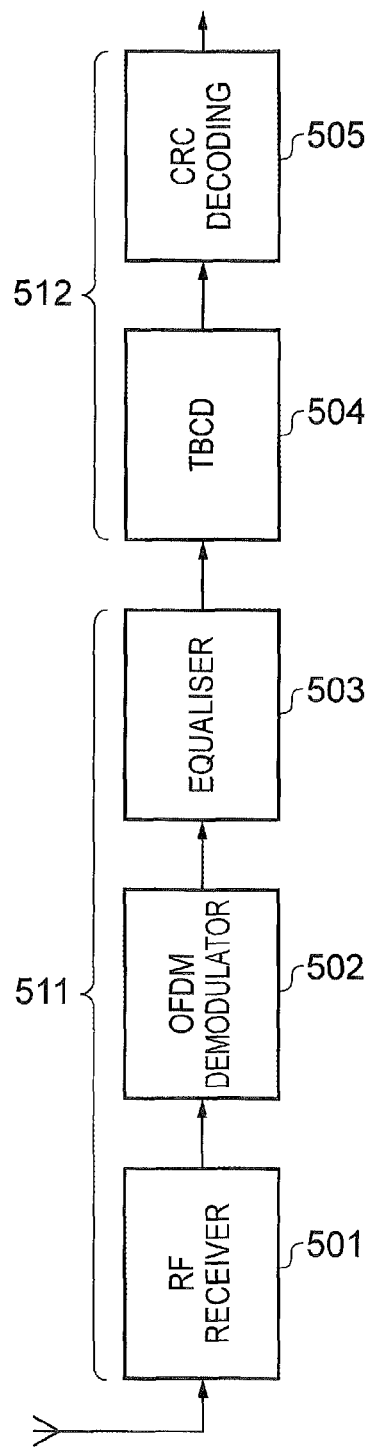
FIG. 5 shows an example of known implementation of a transport and physical channel processing chain at a receiving device.

An example of a known implementation of the transport and physical channel processing applied to the narrowband physical downlink shared channel (NB-PDSCH) and NB-PDCCH at a receiving device is shown in FIG. 5. A signal is received by a radiofrequency (RF) receiver 501 of the receiving device, before being demodulated by an OFDM demodulator 502 and equalised by an equaliser 503. These steps 501, 502, 503 constitute the physical channel processing 511. The signal is then decoded by a tail-biting convolutional decoder (TBCD) (for example, based on a Viterbi decoder) 504 before carrying out cyclic redundancy check (CRC) decoding 505. These steps 504, 505 constitute the transport channel processing 512.

An NB-IoT UE is typically implemented as some generic RF components (filters, switches, amplifiers etc.) and some baseband processing functions. The baseband processing functions performs physical channel processing and transport channel processing functions as exemplified in FIG. 5.

At the receiver, typical physical channel processing functions include:

Fast Fourier transform (FFT)
Channel estimation
Equalisation/detection of modulation symbols
Log-likelihood generation At the receiver, typical transport channel processing functions include:

de-rate matching/de-interleaving
decoding of a tail biting convolutional code
CRC decoding An NB-IoT UE has limited hardware resources for performing physical channel processing and transport channel processing. Typically the NB-IoT receiver would be implemented as software on a digital signal processor (DSP) or general purpose processor. For a simple single core processor, decoding functions cannot be pipelined and all of the decoding processing for a time unit (such as a subframe) must be completed within that time unit (such that the processor is then free to decode the next time unit's worth of received signal).

Figure 6:
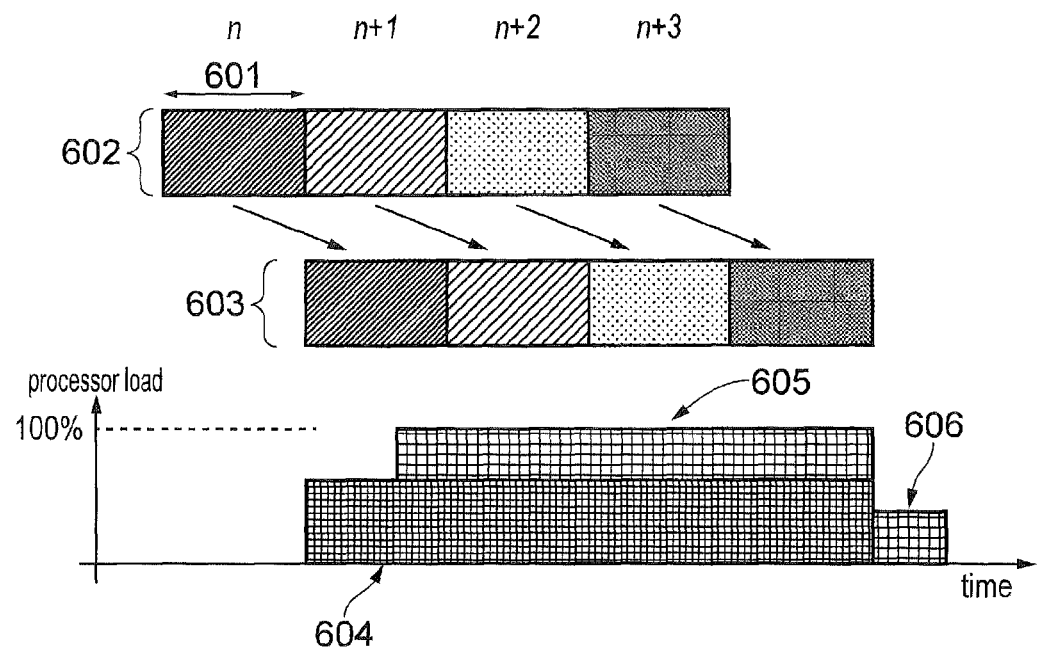
FIG. 6 illustrates an example of the decoding of a continuous NB-IoT signal by a user equipment.

FIG. 6 shows the decoding timeline for a typical processor-based architecture NB-IoT UE when the UE is required to decode a single transport block per subframe 601. In this figure, over-the-air 602 subframe 'n' is decoded 603 at subframe 'n+1'. Correspondingly, over-the-air subframes 'n+1', 'n+2' and 'n+3' are decoded at subframes 'n+2', 'n+3' and 'n+4'. FIG. 6 also shows a graph illustrating a processing load in the UE. When the UE has to decode subframes, the processor typically can be 100% loaded through performing both physical channel processing 604 and transport channel processing 605, 606. At an initial time period, the UE is performing only physical channel processing 604 (at the start of subframe reception). After this initial period, there is a longer period in which UE is performing both physical channel processing 604 and transport channel processing 605. Following this longer period, there is a period when the UE is performing only transport channel processing 606.

If the processor is not able to decode a subframe's worth of received signal within a subframe, it can buffer over-the-air subframes in RAM and decode them at a later time. However this architecture leads to the UE not being able to continually decode subframes and increases the memory requirements at the UE.

When decoding a physical downlink control channel (such as the NB-PDCCH), the UE is required to decode multiple candidate NB-PDCCHs through a blind decoding process. For example, the UE may be required to blind decode NB-PDCCH candidates with three different repetition levels (R1, R2, R3), as shown in FIG. 7.

Figure 7:
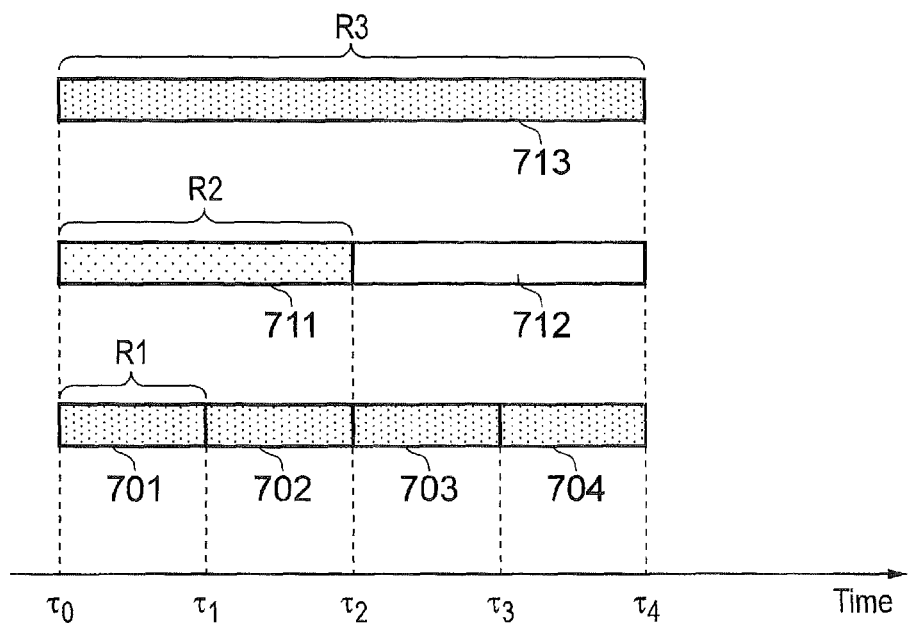
FIG. 7 illustrates an example of NB-PDCCH blind decoding candidates with three different repetition levels.

In FIG. 7, the UE needs to decode a different number of blind decoding candidates at different times. At time $\tau_1$, only one candidate 701 which has repetition level R1 need be decoded. At time $\tau_2$ however, two candidates need be decoded—candidate 702 which has repetition level R1 and candidate 711 which has repetition level R2. At time $\tau_3$, only one candidate 703 which has repetition level R1 need be decoded. At time $\tau_4$, three candidates are required to be blind decoded by the UE. These are candidate 704, which has repetition level R1, candidate 712, which has repetition level R2, and candidate 713, which has repetition level R3.

Figure 8:
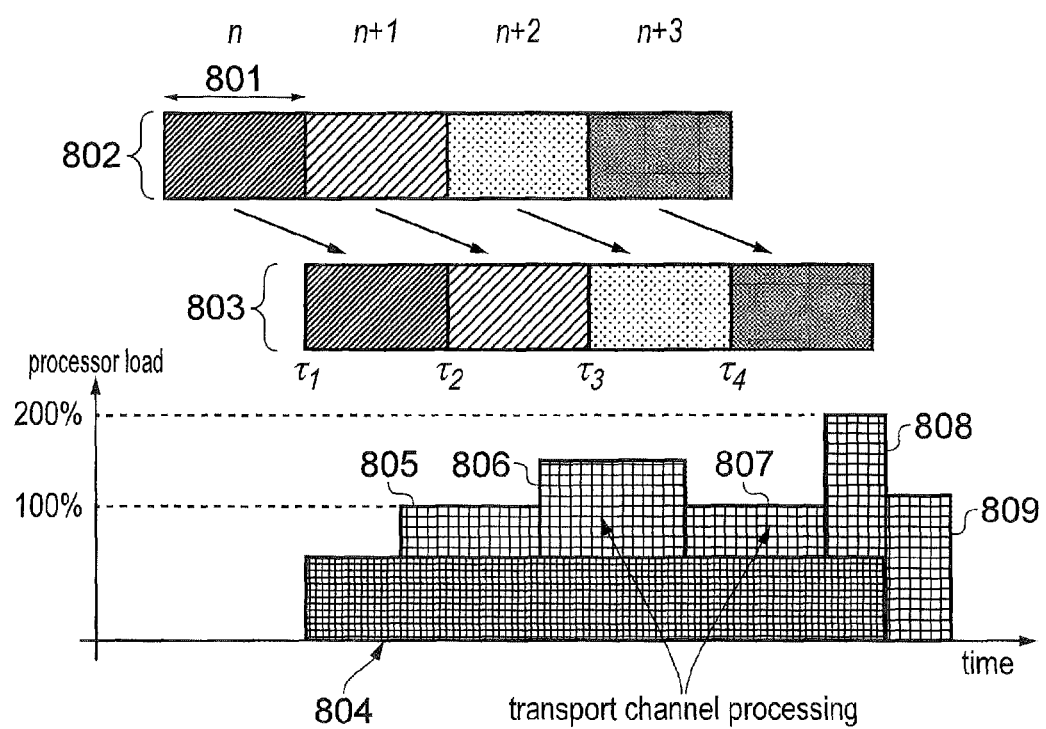
FIG. 8 illustrates an example of the decoding of a continuous NB-IoT signal comprising the candidates as shown in FIG. 7 by a user equipment.

FIG. 8 shows the decoding timeline for the example of FIG. 7, when the UE is required to decode multiple candidates per subframe 801. In this figure, over-the-air 802 subframe 'n' is decoded 803 at subframe 'n+1'. Correspondingly, over-the-air subframes 'n+1', 'n+2' and 'n+3' are decoded at subframes 'n+2', 'n+3' and 'n+4'.

For the set of blind decoding candidates shown in FIG. 7, the processing load is as shown in FIG. 8. In this figure, the physical channel processing load 804 is constant, while the transport channel processing load is shown to vary as a function of the number of blind decodes that are required at any time instant. The single blind decoding candidate at times $\tau_1$ and $\tau_3$ cause transport channel processing loads 805 and 807 respectively, the two blind decoding candidates at time $\tau_2$ cause a greater transport channel processing load 806, and the three blind decoding candidates at time $\tau_4$ cause a greater still transport channel processing load 808, 809. At an initial time period, the UE is performing only physical channel processing 804 (at the start of subframe reception). After this initial period, there is a longer period in which UE is performing both physical channel processing 804 and transport channel processing 805, 806, 807, 808. Following this longer period, there is a period when the UE is performing only transport channel processing 809.

FIG. 8 demonstrates that the requirement to decode multiple NB-PDCCH decoding candidates at some time instances causes the peak processing load of the UE to be exceeded (the figure shows as an example that the peak processing load is increased to 200% of that required to decode a single candidate). Hence an improved arrangement of decoding candidates is required in order to reduce the peak processing load in the UE, in order to reduce the complexity of the UE.

Reduced Complexity Decoding of NB-PDCCH

Figure 9:
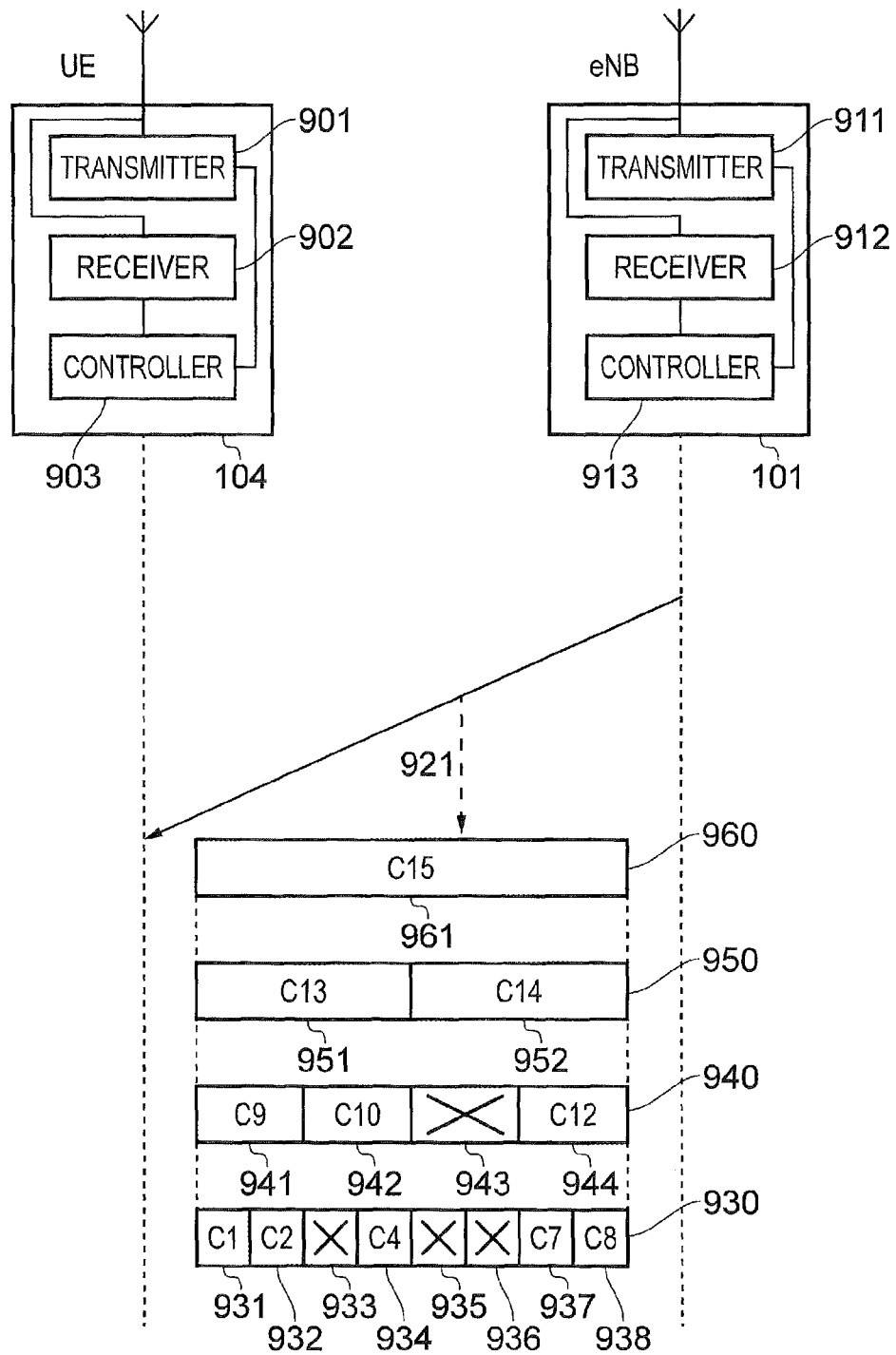
FIG. 9 is a part schematic block diagram of a communications device and an infrastructure equipment, and part message flow diagram illustrating a process of receiving a message at a user equipment transmitted on radio resources selected by a base station from a plurality of NB-PDCCH candidates which define the search space for the communications device to search for the message candidates in accordance with an embodiment of the present technique.

Embodiments of the present technique can provide an arrangement in which a mobile communications device or UE 104 can operate to communicate in a wireless communications system via a base station or infrastructure equipment. FIG. 9 is a part schematic block diagram of a communications device 104 and an infrastructure equipment 101, and part message flow diagram illustrating a process of receiving a message at the communications device 104 transmitted on radio resources selected by the infrastructure equipment 101 from a plurality of NB-PDCCH candidates which define the search space for the communications device to search for the message candidates in accordance with an embodiment of the present technique. Each of the communications device 104 and infrastructure equipment 101 comprise a transmitter 901, 911, a receiver 902, 912 and a controller 903, 913 to control the transmitter 901, 911 and receiver 902, 912.

The receiver 902 of the UE 104 is configured to receive signals from the infrastructure equipment 101 of the wireless communications network in accordance with the wireless access interface provided by the infrastructure equipment 101. A controller is configured to control the receiver 902 to receive data from the infrastructure equipment 101 via a downlink of the wireless access interface. The wireless access interface includes communications resources for allocation to the communications device on the downlink, the communications resources comprising time resources in which the wireless access interface is divided into predetermined time-divided units. The controller 903 is configured in combination with the receiver 902 to receive a message from the infrastructure equipment which has been transmitted with a number of repetitions in a search space formed in the wireless access interface over a number of time units. The search space extends in time sufficient to span a transmission of the message at a highest repetition level associated with the highest number of repetitions and transmitted on radio resources selected by the infrastructure equipment from a plurality of candidates for radio resources which define the search space for the communications device to search for the message. The plurality of candidates comprises candidates associated with a number, N, of different repetition levels for the transmission of the message, and the different repetition levels corresponding with different numbers of repetitions for the transmission of the message. The controller 903 is configured to control the receiver 902 to receive the message within the search space in accordance with a search space pattern for which the receiver 902 can receive a predetermined number of candidates of the message within a time allocated for receiving the message, which is less than or equal to a number of candidates of the message which can be received from the search space within the time allocated for receiving the message.

As shown in FIG. 9, the communications device 104 is configured to receive the message 921 from the infrastructure equipment 101 with a number of repetitions, in a search space over a number of time units. The search space extends in time sufficient to span a transmission of the message at a highest repetition level 960 associated with the highest number of repetitions and transmitted on radio resources selected by the infrastructure equipment 101 from a plurality of candidates 931 to 938, 941 to 944, 951, 952, 961 for radio resources which define the search space for the communications device 104 to search for the message 921. The plurality of candidates 931 to 938, 941 to 944, 951, 952, 961 in the search space pattern comprising candidates 931 to 938, 941 to 944, 951, 952, 961 are associated with a number of different repetition levels 930, 940, 950, 960 for the transmission of the message 921, and the different repetition levels 930, 940, 950, 960 correspond with different numbers of repetitions for the transmission of the message 921. The communications device 104 is configured to receive the message 921 within the search space in accordance with a transmission pattern which requires the communications device to receive a predetermined number of candidates 931 to 938, 941 to 944, 951, 952, 961 of the message 921 within a predetermined reception time where the predetermined number of candidates is less than a number of candidates 931 to 938, 941 to 944, 951, 952, 961 of the message 921 which can be received within the predetermined reception time. In the example illustrated by FIG. 9, the predetermined number of candidates is eleven, and so candidates 933, 935, 936, 943 are not transmitted. This leaves eleven remaining candidates 931, 932, 934, 937, 938, 941, 942, 944, 951, 952, 961 in the search space, with gaps left in the search space at positions 933, 935, 936, 943.

Embodiments of the present disclosure provide techniques of arranging the NB-PDCCH candidates in the NB-PDCCH search space such that the rate of decoding (i.e. the number of NB-PDCCH candidates that the UE needs to decode at any one time) does not exceed a processing capability or memory capability of the UE.

Figure 10:
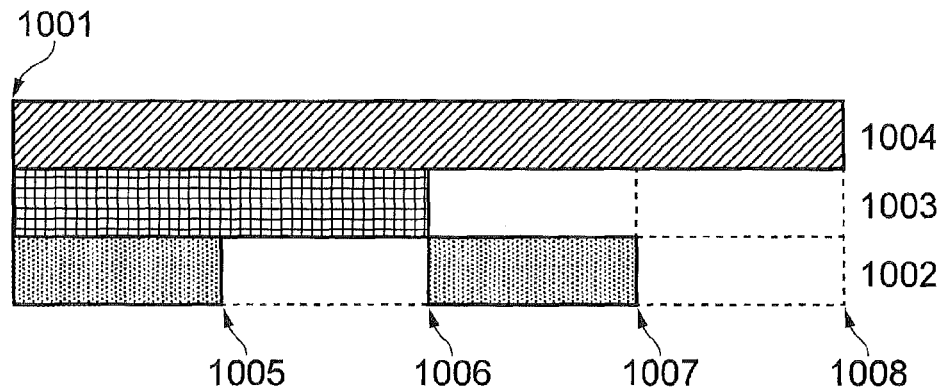
FIG. 10 illustrates an example arrangement of decoding candidates in accordance with an embodiment of the present technique.

In one embodiment of the present disclosure, the decoding candidates may be arranged as shown in FIG. 10. In this embodiment, the following rules are applied:
  The candidates with the largest repetition level are assigned first
  Candidates with a lower repetition level are assigned, but they are not assigned if the candidate ends at the same subframe as a candidate with a higher repetition level
  Repeat previous step until all possible candidates are assigned In FIG. 10, processing begins at subframe $n_0$ 1001, which is the starting subframe of the search space. Candidates may be of three different repetition levels. These are R1, which is the lowest repetition level 1002, R2, which is an intermediate repetition level 1003, and R3, which is the highest repetition level 1004. At position 1005, the UE decodes the first candidate with repetition level R1. At position 1006, the UE decodes the candidate with repetition level R2. At position 1007, the UE decodes the second candidate with repetition level R1. At position 1008, the UE decodes the candidate with repetition level R3.

With regard to the rules applied in this embodiment of the present technique, the UE is only required to decode a single NB-PDCCH candidate per subframe. Potential candidates for repetition level RL start at subframe $n_0 + k*RL$, where k is an index that covers the range 0 to $K_{max}-1$, where $K_{max}$ is equal to the length of the search space divided by RL. The UE prioritises decoding candidates with a higher RL over those with a lower RL.

In another embodiment of the present disclosure, the search space (in terms of subframes) consists of alternate subframes (e.g. odd numbered or even numbered subframes). In this case, there are times when the UE does not need to perform physical channel processing and can instead perform transport channel processing of multiple blind decoding candidates. An example of this embodiment is shown in FIG. 11, in which the blind decoding candidates are as shown in FIG. 7.

Figure 11:
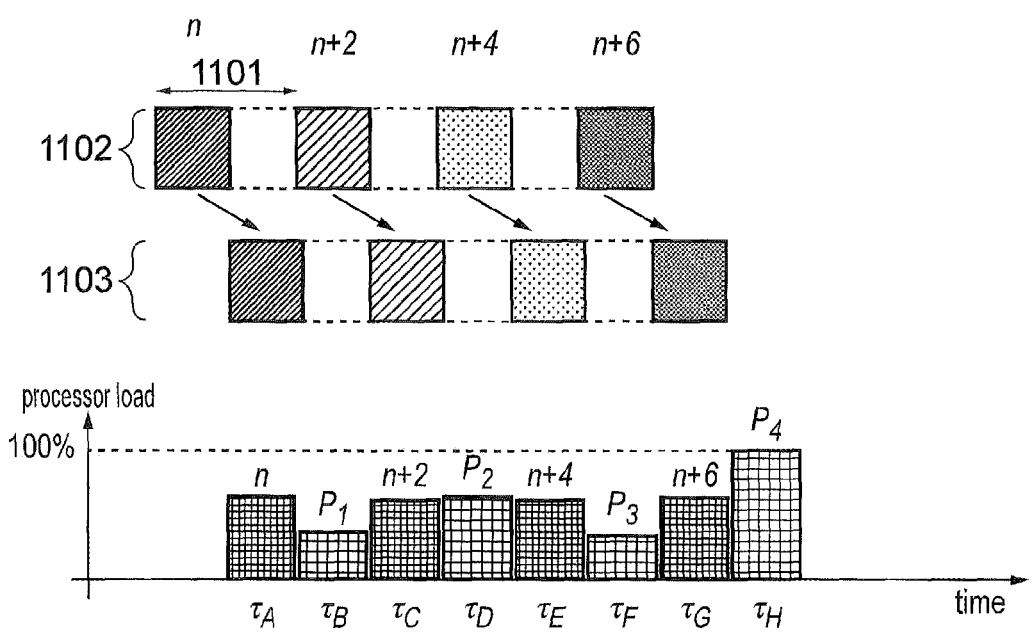
FIG. 11 illustrates an example of UE decoding of a discontinuous NB-IoT signal in accordance with an embodiment of the present technique.

FIG. 11 shows that the over-the-air 1102 transmission of subframes contains transmission gaps (in the example, the transmission gap is a single subframe: the dashed portion of 1101). The transmission gaps allow the UE receiver to swap between physical channel processing (of over-the-air subframes 1102) and transport channel processing (of decoding candidates). Since the UE does not need to perform physical channel processing and transport channel processing in the same subframe, the peak processing load of the UE is reduced.

In the embodiment illustrated in FIG. 11, Table I below describes how processing is performed at the UE at each of the times $\tau_A$ to $\tau_H$. Because both physical channel processing and transport channel processing are not required contemporaneously, the peak processing load in the UE is reduced.

TABLE I

| Time period | UE processing function |
| --- | --- |
| $\tau_A$ | Physical processing of subframe n |
| $\tau_B$ | Blind decoding of a single candidate: processing load = P1 |
| $\tau_C$ | Physical processing of subframe n + 2 |
| $\tau_D$ | Blind decoding of two candidates (e.g. R1, R2): processing load = P2 |
| $\tau_E$ | Physical processing of subframe n + 4 |
| $\tau_F$ | Blind decoding of single candidate (e.g. R1): processing load = P3 (=P1) |
| $\tau_G$ | Physical processing of subframe n + 6 |
| $\tau_H$ | Blind decoding of three candidates (e.g. R1, R2, R3): processing load = P4 |

In a first configuration of this embodiment of the present disclosure, UEs are assigned to "odd subframe search spaces" or "even subframe search spaces" as a function of a UE identity (such as the Radio Network Temporary Identifier (RNTI) or Temporary Mobile Subscriber Identity (TMSI)). In this embodiment, the eNodeB can use all subframes for transmission of NB-PDCCH, where some subframes are assigned to a first set of UEs and other subframes are assigned to a second set of UEs.

Alternatively, the UE can be assigned an "odd subframe search space" or an "even subframe search space" via UE specific signaling. Here, the odd or even index of the search space does not have to be a function of UE identity, but can be assigned by the network.

In a second configuration of this embodiment of the present disclosure, the common search space is assigned using either "odd subframe search spaces" or "even subframe search spaces". Different usages of the common search space can use different types of subframe. For example, NB-PDCCH for Random Access Response (RAR) may use an odd subframe search space, whereas NB-PDCCH for paging may use an even subframe search space.

Figure 12:
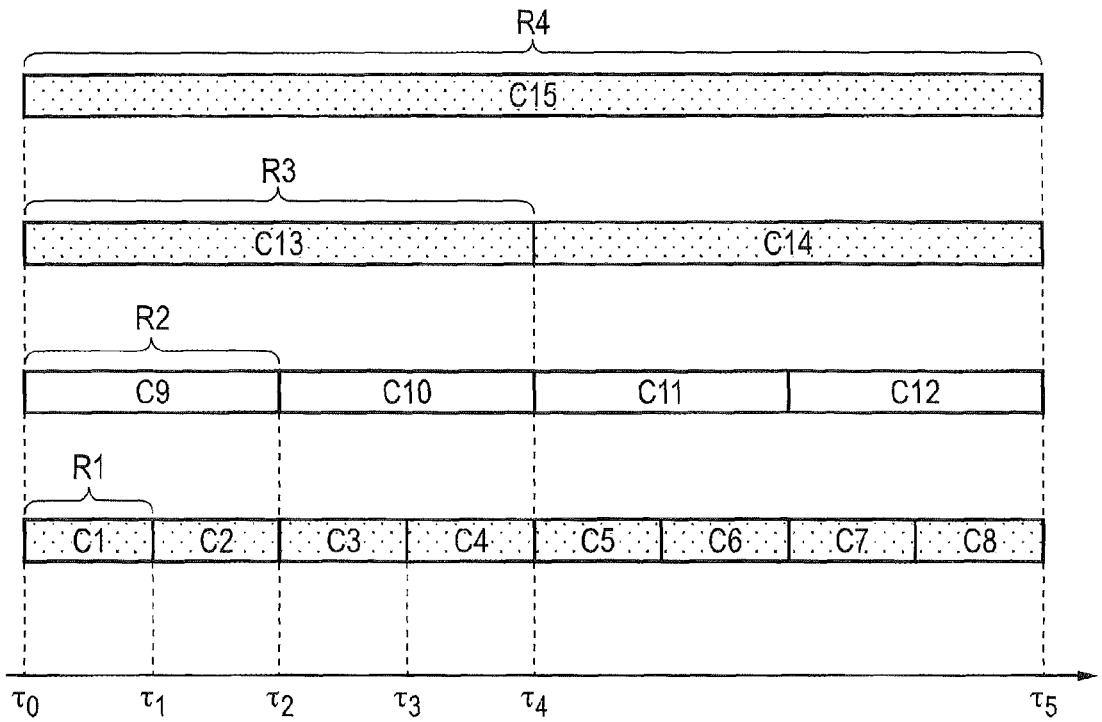
FIG. 12 illustrates an example of a repetition arrangement in a Rel-13 eMTC search space.

It is expected that NB-IoT would adopt the search space repetition arrangement similar to that for Rel-13 eMTC M-PDCCH, as shown in FIG. 12. Here, there are four repetition levels, R1, R2, R3, R4, and multiple smaller repetitions can occur within a larger repetition (e.g. eight R1 candidates (C1 to C8) can exist within one R4 candidate, C15). As described, such an arrangement may be challenging for a NB-IoT UE with a limited processing capability. If the UE is allowed to finish its blind decoding of a set of candidates before new candidates are added to its processing, there is a reduced requirement to buffer for these new candidates for later processing. Therefore, if a candidate is long enough, the UE can finish decoding a previous candidate before it needs to decode the current candidate. For example in FIG. 12, at time $\tau_1$, the UE needs to decode candidate C1 with a repetition level R1. If $\tau_D \leq R1$, where $T_D$ is the decoding time of a candidate, then the UE can finish decoding the candidate C1 before time $\tau_2$ where it needs to decode candidate C2 (with a repetition level R1). If $T_D > R1$, then the UE would need to buffer candidate C2 while decoding candidate C1 so that it can decode candidate C2 later.

In another embodiment, consequently, a repetition candidate is removed from the search space if it adds to the ongoing processing load of the UE. This effectively means that the arrangement of the search space is a function of the UE processing time and the number of repetitions required for the candidates in the search space. The most challenging repetition is when R1=1 (where this means 1 subframe or 1 ms), and where the four repetition levels are R1=1, R2=2, R3=4, and R4=8. In 3GPP it is assumed that the UE can perform four blind decodes within 4 ms. Assuming that it takes $T_D$=1 ms (1 subframe) to decode 1 NB-PDCCH candidate, an example search space is shown in FIG. 13.

Figure 13:
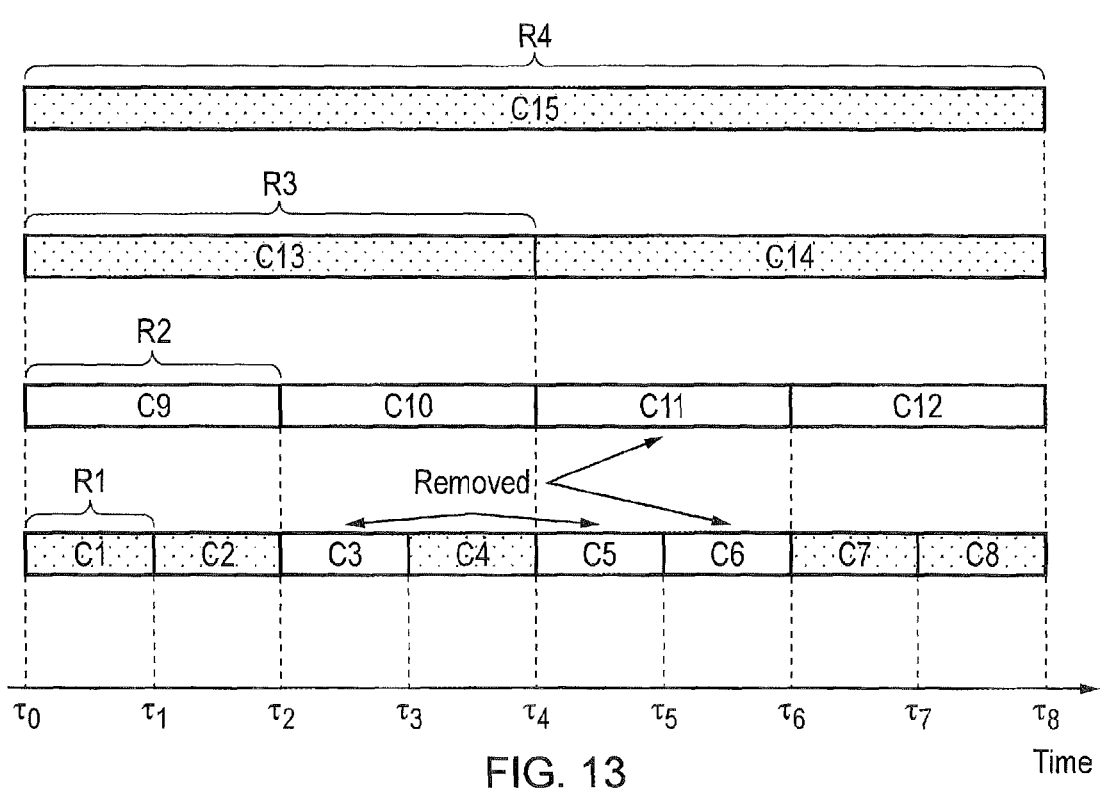
FIG. 13 illustrates a first example of the removal of candidates in accordance with an embodiment of the present technique.

In FIG. 13, it can be seen that at time $\tau_1$, the UE has to (blind) decode candidate C1 with repetition R1=1. Since $T_D \leq R1=1$ ms, the UE can finish the decoding of C1 before it needs to decode C2 and so candidate C2 is not removed. At time $\tau_2$, the UE has to decode candidate C2 (R1=1) and C9 (R2=2), which would take 2 ms or 2 subframes (i.e. 2×$T_D$), which would occur between time $\tau_2$ to $\tau_4$. To avoid adding to the UE's processing, candidates that need to be processed within time $\tau_2$ to $\tau_4$ are removed from the search space (e.g. candidate C3 is removed). At time $\tau_4$, the UE has to process candidates C4, C10 and C13 which will take 3 ms. Therefore no additional processing is added between time $\tau_2$ to $\tau_4$, as candidates C5, C6 and C11 are also removed from the search space. At time $\tau_7$, the UE need only process candidate C7, which can be done before time $\tau_8$. At time $\tau_8$, the UE has to process 4 candidates C8, C12, C14 and C15 which can be done in 4 ms (no search space is allocated within this 4 ms, as shown in FIG. 4).

Figure 14:
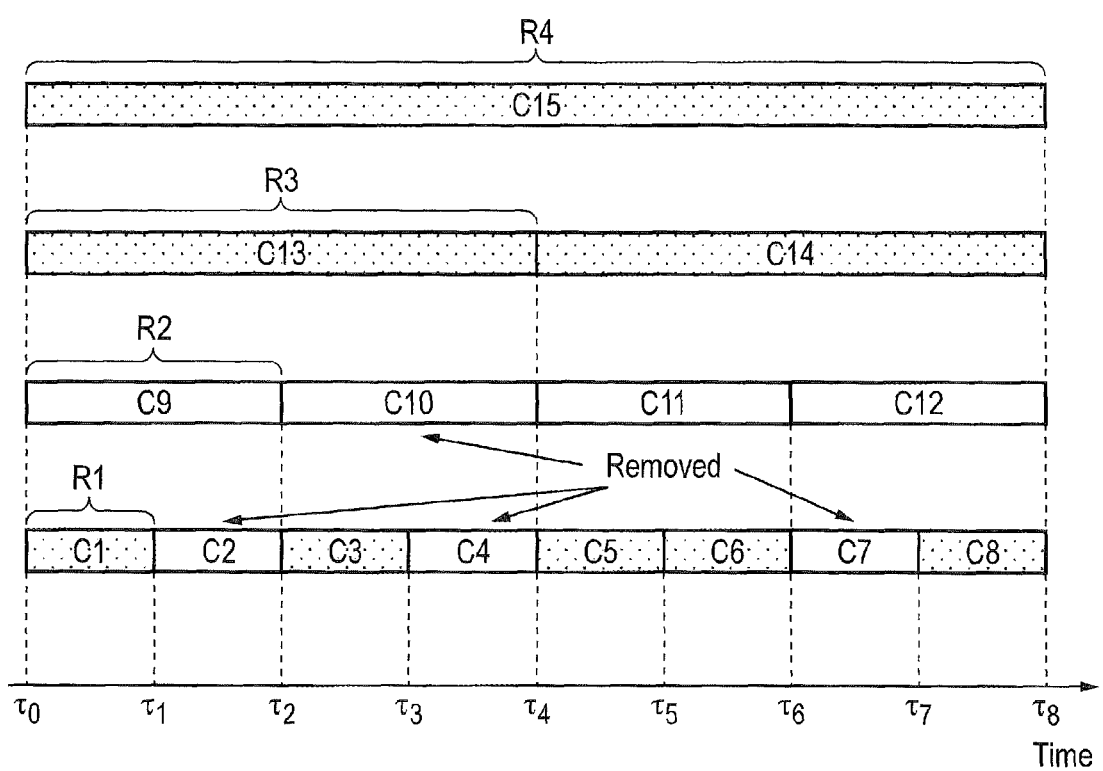
FIG. 14 illustrates a second example of the removal of candidates in accordance with an embodiment of the present technique.

It should be appreciated that FIG. 13 illustrates one possible search space arrangement for the criteria in this embodiment and that there are other possible arrangements. For example, FIG. 14 is another search space arrangement conforming to the same criteria of the presently described embodiment of the present technique. Here at $\tau_1$, the UE will start to process candidate C1 (with repetition level R1=1), and would finish processing it at time $\tau_2$. Candidate C2 is removed in this arrangement (instead of C3 in the arrangement illustrated in FIG. 13) so that at time $\tau_2$, the UE needs only to (blind) decode candidate C9 which can be completed at time $\tau_3$. The UE can therefore decode candidate C3 at time $\tau_3$ since it does not add to the current processing load. Candidate C4 and C10 are removed from the search space in this arrangement (instead of C5 and C11 in the arrangement illustrated in FIG. 13) so that the UE need only blind decode candidate C13 at time $\tau_4$, which can be completed at time $\tau_5$. In this way, candidates C5, C6 and C11 can be maintained since they do not add to the ongoing processing load of the UE. At time $\tau_6$, the UE needs to blind decode candidate C6 and C11, which will take 2 ms (and so will be completed at time $\tau_8$). Here, candidate C7 would add to the UE processing load, and therefore it is removed from the search space. Again, at time $\tau_8$, the UE has to process 4 candidates C8, C12, C14 and C15 which can be done in 4 ms (no search space is allocated within this 4 ms, as shown in FIG. 4).

Typically, for USS (UE Specific Search Space), the eNodeB would configure the UE with a search space within a set of known search spaces (i.e. specified in the specifications). It can be observed that the search spaces in FIGS. 13 and 14 have different candidates removed. Hence, in another example, the eNodeB can configure a UE, for example, UE1, to use a search space as in FIG. 13, whilst configuring another UE, for example, UE2, to use a search space as in FIG. 14. In this way, the eNB can utilise all the candidates (but for different UEs).

The following numbered paragraphs provide further example aspects and features of the present technique:

Paragraph 1. A communications device comprising
a receiver configured to receive signals from an infrastructure equipment of a wireless communications network in accordance with a wireless access interface provided by the infrastructure equipment, and
a controller configured to control the receiver to receive data from the infrastructure equipment via a downlink of the wireless access interface, wherein the wireless access interface includes communications resources for allocation to the communications device on the downlink, the communications resources comprising time resources in which the wireless access interface is divided into predetermined time-divided units and the controller is configured in combination with the receiver
to receive a message from the infrastructure equipment which has been transmitted with a number of repetitions, to enhance the likelihood that the communications device will successfully decode the message, in a search space formed in the wireless access interface over a number of time units, the search space extending in time sufficient to span a transmission of the message at a highest repetition level associated with the highest number of repetitions and transmitted on radio resources selected by the infrastructure equipment from a plurality of candidates for radio resources which define the search space for the communications device to search for the message, the plurality of candidates comprising candidates associated with a number, N, of different repetition levels for the transmission of the message, and the different repetition levels corresponding with different numbers of repetitions for the transmission of the message, wherein the controller is configured to control the receiver to receive the message within the search space in accordance with a search space pattern for which the receiver can receive a predetermined number of candidates of the message within a time allocated for receiving the message, which is less than a number of candidates of the message which can be received from the search space within the time allocated for receiving the message.

Paragraph 2. A communications device according to paragraph 1, wherein the controller is configured in combination with the receiver to receive the predetermined number of candidates of the message within the search space in accordance with the search space pattern, and the infrastructure equipment arranges the transmission of the candidates with different repetition levels within the predetermined number within the time allocated for receiving the message by reducing a number of candidates transmitted with the lower repetition level so that the communications device does not need to decode more than the predetermined number of candidates within the time allocated for receiving the message.

Paragraph 3. A communications device according to paragraph 1 or 2, wherein the predetermined number of candidates of the message which can be received by the receiver according to the search space pattern is dependent on the processing capability of the communications device.

Paragraph 4. A communications device according to paragraph 1, 2 or 3, wherein the time allocated for receiving the message comprises a time for transmission of the search space.

Paragraph 5. A communications device according to paragraph 4, wherein the search space is received repeatedly and periodically in which the period is a sum of a time allocated for the communications device to receive and to decode the candidate messages when the search space is not transmitted, and the time allocated for receiving and decoding the candidate messages when the search space is transmitted.

Paragraph 6. A communications device according to any of paragraphs 1 to 5, wherein the search space consists of time units with only an even index, or time units with only an odd index.

Paragraph 7. A communications device according to paragraph 1, wherein the controller is configured in combination with the receiver to receive the predetermined number of candidates of the message within the search space in accordance with the search space pattern in which a candidate with a higher repetition level is transmitted by the infrastructure equipment in preference to a candidate with a lower repetition level.

Paragraph 8. A communications device according to any of paragraphs 1 to 7, wherein the search space pattern is different for the communications device with respect to a search space pattern of other communications devices.

Paragraph 9. An infrastructure equipment of a mobile communications network configured to transmit signals to a communications device, the infrastructure equipment comprising a transmitter configured to transmit signals to the communications device in accordance with a wireless access interface, and a controller configured to control the transmitter to transmit messages via a downlink of the wireless access interface, wherein the controller is configured in combination with the transmitter to transmit selectively a message to the communications device with a number of repetitions, to enhance the likelihood the communications device will successfully decode the message, in a search space formed in the wireless access interface over a number of time units, the search space extending in time sufficient to span a transmission of the message at a highest repetition level associated with the highest number of repetitions and transmitted on radio resources selected by the infrastructure equipment from a plurality of candidates for radio resources which define the search space for the communications device to search for the message, the plurality of candidates comprising candidates associated with a number, N, of different repetition levels for the transmission of the message, and the different repetition levels corresponding with different numbers of repetitions for the transmission of the message, wherein the controller is configured to control the transmitter to transmit the message within the search space in accordance with a search space pattern for which the communications device can receive a predetermined number of candidates of the message within a time allocated for receiving the message, which is less than a number of candidates of the message which can be transmitted to the communications device via the search space within the time allocated for receiving the message.

Paragraph 10. An infrastructure equipment according to paragraph 9, wherein the controller is configured in combination with the transmitter to transmit the predetermined number of candidates of the message within the search space in accordance with the search space pattern by arranging the transmission of the candidates with different repetition levels within the predetermined number within the time allocated for receiving the message by reducing a number of candidates transmitted with the lower repetition level so that the communications device does not need to decode more than the predetermined number of candidates within the time allocated for receiving the message.

Paragraph 11. An infrastructure equipment according to paragraph 10, wherein the controller is configured in combination with the transmitter to transmit the predetermined number of candidates of the message within the search space in accordance with the search space pattern differently depending upon a processing capability of the communications device, the transmission within the search space reducing a number of candidates of the message which must be decoded by the communications device to the predetermined number within a time allocated for receiving the message.

Paragraph 12. A communications device according to paragraph 8, wherein the time allocated for receiving the message comprises a time for transmission of the search space.

Paragraph 13. An infrastructure equipment according to paragraph 10, 11 or 12, wherein the search space is transmitted repeatedly and periodically between a processing time allocated for the communications device to receive and to decode the message when the search space is not transmitted, and the time allocated for receiving the message comprises the time for transmission of the search space and the processing time.

Paragraph 14. A communications device according to any of paragraphs 10 to 13, wherein the search space consists of the number of time units of only an even index, or the number of time units of only an odd index.

Paragraph 15. An infrastructure equipment according to any of paragraphs 10 to 14, wherein the controller is configured in combination with the transmitter to transmit the predetermined number of candidates of the message within the search space by transmitting a candidate with a higher repetition level in preference to a candidate with a lower repetition level.

Paragraph 16. An infrastructure equipment according to any of paragraphs 10 to 14, wherein the communications device is a first communications device, the message is a first message and the search space pattern is a first search space pattern, and the controller is configured in combination with the transmitter to transmit the first message in the first search space to the first communications device in accordance with the first search space pattern and to transmit a second message to a second communications device via the search space in accordance with a second search space pattern, the second search space pattern providing the predetermined number of candidates of the message within the time allocated for receiving the message, which is less than the number of candidates of the message which can be transmitted to the communications device via the search space within the time allocated for receiving the message, and the radio resources selected by the infrastructure equipment from the plurality of candidates for radio resources which define the search space is different for the second search space pattern from the first search space pattern.

Paragraph 17. An infrastructure equipment according to paragraph 16, wherein the first message is the same as the second message, the message being a common message for both first and second communication devices.

Paragraph 18. An infrastructure equipment according to any of paragraphs 10 to 14, wherein the communications device is a first communications device, the message is a first message and the search space pattern is a first search space pattern, and the controller is configured in combination with the transmitter to transmit the first message in the first search space to the first communications device in accordance with the first search space pattern and to transmit one or more other messages to one or more other communications devices via the search space in accordance with one or more other search space patterns, the other search space patterns providing the predetermined number of candidates of the message within the time allocated for receiving the message, which is less than the number of candidates of the message which can be transmitted to the communications device via the search space within the time allocated for receiving the message, and in combination the first search space pattern and the one or more other search space patterns are arranged to occupy all of the radio resources which define the search space.

Paragraph 19. An infrastructure equipment according to paragraph 18, wherein the first message is the same as the second message, the message being a common message for both first and second communication devices.

Annex 1:

The simplified structure of the downlink of an LTE wireless access interface presented in FIG. 2, also includes an illustration of each subframe 201, which comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel PDCCH, a physical control format indicator channel PCFICH and a physical HARQ indicator channel PHICH. The data region may contain a number of physical channel for the transmission of data, such as a physical downlink shared channel PDSCH and a physical broadcast channels PBCH. Although these physical channels provide a wide range of functionality to LTE systems, in terms of resource allocation and the present disclosure PDCCH and PDSCH are most relevant. Further information on the structure and functioning of the physical channels of LTE systems can be found in [1].

Resources within the PDSCH may be allocated by an eNodeB to UEs being served by the eNodeB. For example, a number of resource blocks of the PDSCH may be allocated to a UE in order that it may receive data that it has previously requested or data which is being pushed to it by the eNodeB, such as radio resource control RRC signalling. In FIG. 2, UE1 has been allocated resources 208 of the data region 206, UE2 resources 209 and UE resources 210. UEs in a an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resources, resource control information specifying downlink resource allocations is conveyed across the PDCCH in a form termed downlink control information DCI, where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Each uplink subframe may include a plurality of different channels, for example a physical uplink shared channel PUSCH 305, a physical uplink control channel PUCCH 306, and a physical random access channel PRACH. The physical Uplink Control Channel PUCCH may carry control information such as ACK/NACK to the eNodeB for downlink transmissions, scheduling request indicators SRI for UEs wishing to be scheduled uplink resources, and feedback of downlink channel state information CSI for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks.

As well as physical uplink channels, uplink subframes may also include reference signals. For example, demodulation reference signals DMRS 307 and sounding reference signals SRS 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNodeB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information UCI on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

REFERENCES

[1] LTE for UMTS: OFDMA and SC-FDMA Based Radio Access, Harris Holma and Antti Toskala, Wiley 2009, ISBN 978-0-470-99401-6.
[2] RP-151621, "New Work Item: NarrowBand IOT NB-IOT," Qualcomm, RAN #69
[3] R1-157783, "Way Forward on NB-IoT," CMCC, Vodafone, Ericsson, Huawei, HiSilicon, Deutsche Telekom, Mediatek, Qualcomm, Nokia Networks, Samsung, Intel, Neul, CATR, AT&T, NTT DOCOMO, ZTE, Telecom Italia, IITH, CEWiT, Reliance-Jio, CATT, u-blox, China Unicom, LG Electronics, Panasonic, Alcatel-Lucent, Alcatel-Lucent Shanghai Bell, China Telecom, RAN1 #83

What is claimed is:

1. A communications device comprising:
   a receiver configured to receive signals from an infrastructure equipment of a wireless communications network in accordance with a wireless access interface provided by the infrastructure equipment, and
   a controller configured to control the receiver to receive data from the infrastructure equipment via a downlink of the wireless access interface, wherein the wireless access interface includes communications resources for allocation to the communications device on the downlink, the communications resources comprising time resources in which the wireless access interface is divided into predetermined time-divided units and the controller is configured in combination with the receiver
   to receive a message from the infrastructure equipment which has been transmitted with a number of repetitions, to enhance the likelihood that the communications device will successfully decode the message, in a search space formed in the wireless access interface over a number of time units, the search space extending in time sufficient to span a transmission of the message at a highest repetition level associated with the highest number of repetitions and transmitted on radio resources selected by the infrastructure equipment from a plurality of candidates for radio resources which define the search space for the communications device to search for the message, the plurality of candidates comprising candidates associated with a number, N, of different repetition levels for the transmission of the message, and the different repetition levels corresponding with different numbers of repetitions for the transmission of the message, wherein the controller is configured to control the receiver to receive the message within the search space in accordance with a search space pattern for which the receiver can receive a predetermined number of candidates of the message within a time allocated for receiving the message, which is less than or equal to a number of candidates of the message which can be received from the search space within the time allocated for receiving the message.

2. A communications device as claimed in claim 1, wherein the controller is configured in combination with the receiver to receive the predetermined number of candidates of the message within the search space in accordance with the search space pattern, and the infrastructure equipment arranges the transmission of the candidates with different repetition levels within the time allocated for receiving the message by reducing a number of candidates transmitted so that the communications device does not need to decode more than the predetermined number of candidates within the time allocated for receiving the message.

3. A communications device as claimed in claim 1, wherein the predetermined number of candidates of the message which can be received by the receiver according to the search space pattern is dependent on the processing capability of the communications device.

4. A communications device as claimed in claim 1, wherein the time allocated for receiving the message comprises a time for transmission of the search space.

5. A communications device as claimed in claim 4, wherein the search space is received repeatedly and periodically in which the period is a sum of a time allocated for the communications device to receive and to decode the candidate messages when the search space is not transmitted, and the time allocated for receiving and decoding the candidate messages when the search space is transmitted.

6. A communications device as claimed in claim 1, wherein the search space consists of time units with only an even index, or time units with only an odd index.

7. A communications device as claimed in claim 1, wherein the controller is configured in combination with the receiver to receive the predetermined number of candidates of the message within the search space in accordance with the search space pattern in which a candidate with a higher repetition level is transmitted by the infrastructure equipment in preference to a candidate with a lower repetition level.

8. A communications device as claimed in claim 1, wherein the search space pattern is different for the communications device with respect to a search space pattern of one or more other communications devices.

9. An infrastructure equipment of a mobile communications network configured to transmit signals to a communications device, the infrastructure equipment comprising:
   a transmitter configured to transmit signals to the communications device in accordance with a wireless access interface, and a controller configured to control the transmitter to transmit messages via a downlink of the wireless access interface, wherein the controller is configured in combination with the transmitter to transmit selectively a message to the communications device with a number of repetitions, to enhance the likelihood the communications device will successfully decode the message, in a search space formed in the wireless access interface over a number of time units, the search space extending in time sufficient to span a transmission of the message at a highest repetition level associated with the highest number of repetitions and transmitted on radio resources selected by the infrastructure equipment from a plurality of candidates for radio resources which define the search space for the communications device to search for the message, the plurality of candidates comprising candidates associated with a number, N, of different repetition levels for the transmission of the message, and the different repetition levels corresponding with different numbers of repetitions for the transmission of the message, wherein the controller is configured to control the transmitter to transmit the message within the search space in accordance with a search space pattern for which the communications device can receive a predetermined number of candidates of the message within a time allocated for receiving the message, which is less than or equal to a number of candidates of the message which can be transmitted to the communications device via the search space within the time allocated for receiving the message.

10. An infrastructure equipment as claimed in claim 9, wherein the controller is configured in combination with the transmitter to transmit the predetermined number of candidates of the message within the search space in accordance with the search space pattern by arranging the transmission of the candidates with different repetition levels within the time allocated for receiving the message by reducing a number of candidates transmitted so that the communications device does not need to decode more than the predetermined number of candidates within the time allocated for receiving the message.

11. An infrastructure equipment as claimed in claim 10, wherein the controller is configured in combination with the transmitter to transmit the predetermined number of candidates of the message within the search space in accordance with the search space pattern differently depending upon a processing capability of the communications device, the transmission within the search space reducing a number of candidates of the message which must be decoded by the communications device to the predetermined number within a time allocated for receiving the message.

12. A communications device as claimed in claim 8, wherein the time allocated for receiving the message comprises a time for transmission of the search space.

13. An infrastructure equipment as claimed in claim 10, wherein the search space is transmitted repeatedly and periodically between a processing time allocated for the communications device to receive and to decode the message when the search space is not transmitted, and the time allocated for receiving the message comprises the time for transmission of the search space and the processing time.

14. An infrastructure equipment as claimed in claim 10, wherein the search space consists of the number of time units of only an even index, or the number of time units of only an odd index.

15. An infrastructure equipment as claimed in claim 10, wherein the controller is configured in combination with the transmitter to transmit the predetermined number of candidates of the message within the search space by transmitting a candidate with a higher repetition level in preference to a candidate with a lower repetition level.

16. An infrastructure equipment as claimed in claim 10, wherein the communications device is a first communications device, the message is a first message and the search space pattern is a first search space pattern, and the controller is configured in combination with the transmitter to transmit the first message in the first search space to the first communications device in accordance with the first search space pattern and to transmit a second message to a second communications device via the search space in accordance with a second search space pattern, the second search space pattern providing the predetermined number of candidates of the message within the time allocated for receiving the message, which is less than the number of candidates of the message which can be transmitted to the communications device via the search space within the time allocated for receiving the message, and the radio resources selected by the infrastructure equipment from the plurality of candidates for radio resources which define the search space is different for the second search space pattern from the first search space pattern.

17. An infrastructure equipment as claimed in claim 16, wherein the first message is the same as the second message, the message being a common message for both first and second communication devices.

18. An infrastructure equipment as claimed in claim 10, wherein the communications device is a first communications device, the message is a first message and the search space pattern is a first search space pattern, and the controller is configured in combination with the transmitter to transmit the first message in the first search space to the first communications device in accordance with the first search space pattern and to transmit one or more other messages to one or more other communications devices via the search space in accordance with one or more other search space patterns, the other search space patterns providing the predetermined number of candidates of the message within the time allocated for receiving the message, which is less than the number of candidates of the message which can be transmitted to the communications device via the search space within the time allocated for receiving the message, and in combination the first search space pattern and the one or more other search space patterns are arranged to occupy all of the radio resources which define the search space.

19. An infrastructure equipment as claimed in claim 18, wherein the first message is the same as the second message, the message being a common message for both first and second communication devices.

20. A method of controlling a communications device to receive a message from an infrastructure equipment of a wireless communications network, the method comprising:
receiving signals from the infrastructure equipment in accordance with a wireless access interface provided by the infrastructure equipment via an downlink of the wireless access interface, wherein the wireless access interface includes communications resources for allocation to the communications device on the downlink, the communications resources comprising time resources in which the wireless access interface is divided into predetermined time-divided units, the method comprising receiving the message from the infrastructure equipment which has been transmitted with a number of repetitions, to enhance the likelihood the communications device will successfully decode the message, in a search space formed in the wireless access interface over a number of time units, the search space extending in time sufficient to span a transmission of the message at a highest repetition level associated with the highest number of repetitions and transmitted on radio resources selected by the infrastructure equipment from a plurality of candidates for radio resources which define the search space for the communications device to search for the message, the plurality of candidates comprising candidates associated with a number, N, of different repetition levels for the transmission of the message, and the different repetition levels corresponding with different numbers of repetitions for the transmission of the message, wherein the receiving the message within the search space comprises receiving the message within the search space in accordance with a search space pattern for which the receiver can receive a predetermined number of candidates of the message within a time allocated for receiving the message, which is less than or equal to a number of candidates of the message which can be received from the search space within the time allocated for receiving the message.

* * * * *